J. H. LARSON.
WHIP SOCKET.
APPLICATION FILED DEC. 31, 1908.
931,437.
Patented Aug. 17, 1909.
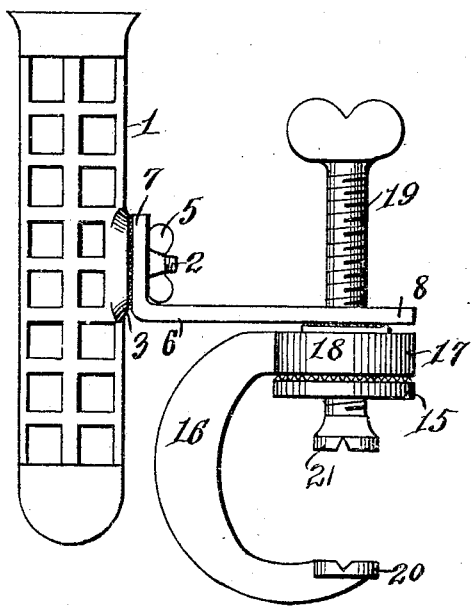
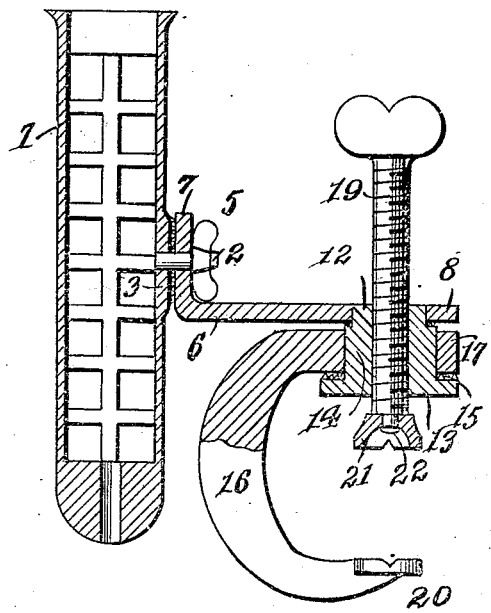
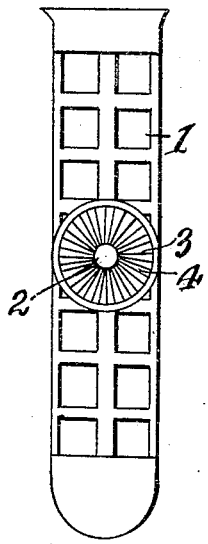
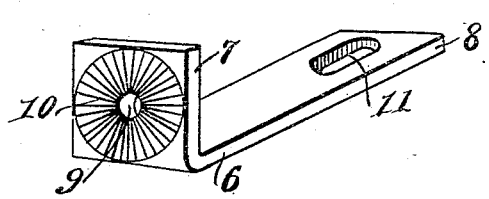
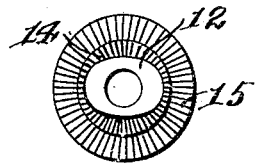
Witnesses
William C. Linton.
J. W. Garner
Inventor
Jacob H. Larson.
By Victor J. Evans
Attorney

UNITED STATES PATENT OFFICE.

JACOB H. LARSON, OF TROUTDALE, OREGON.

WHIP-SOCKET.

No. 931,437.  Specification of Letters Patent.  Patented Aug. 17, 1909.

Application filed December 31, 1908. Serial No. 470,177.

*To all whom it may concern:*

Be it known that I, JACOB H. LARSON, a citizen of the United States, residing at Troutdale, in the county of Multnomah and State of Oregon, have invented new and useful Improvements in Whip-Sockets, of which the following is a specification.

This invention relates to improvements in whip sockets and particularly with reference to improved means for attaching a whip socket to a dash board, standard or other part of a vehicle or farm machine and to enable the whip socket to be adjusted so that it may be under all circumstances maintained in a vertical position.

My invention consists in the construction, combination and arrangement of devices hereinafter described and claimed.

In the accompanying drawings:—Figure 1 is an elevation of a whip socket constructed in accordance with my invention. Fig. 2 is a sectional view of the same. Fig. 3 is a detail elevation of the socket, detached from the clamp and angle arm. Fig. 4 is a detail perspective view of the angle arm. Fig. 5 is an end elevation of the pivot sleeve which connects the angle arm to the clamp.

The whip socket 1 is here shown as an integral casting. It is provided on one side with a projecting screw-threaded stem 2 and a circular base 3, which base is provided with radial serrations 4. A winged nut 5 is provided which is adapted to be screwed on and unscrewed from the threaded stem 2.

In connection with the whip socket I provide an angle arm 6 having a comparatively short member 7 and a longer member 8 at right angles thereto. Said shorter member has a central opening 9 for the screw threaded stem 2 and is provided on one side with radial serrations 10 to coact with the serrations 4 of the socket and with the stem 2 and winged nut 5 to secure the socket to the angle arm in the desired position. The lower member 8 of the angle arm is provided near its outer end with an opening 11 for the reception of a projection 12 of the pivot sleeve 13, the said projection being swaged in said opening so as to securely fasten the pivot sleeve to said angle arm. The said pivot sleeve has a cylindrical portion 14 and a head 15 at the outer end of said cylindrical portion, the said head being provided on its inner side with radial serrations. A substantially C-shaped clamp 16 is provided with an arm 17 at one side, which arm has an opening for the reception of the cylindrical portion 14 of the pivot sleeve and also has a cylindrically shaped enlarged portion 18 provided on the side which is opposed to the head 15 with radial serrations which coact with those of said head to lock said clamp to said pivot sleeve at any desired angular adjustment. A binding screw 19 extends through and engages a threaded opening in the pivot sleeve and is provided at its inner end, which is opposed to the foot 20 of the clamp, with a foot 21 which is swiveled to said inner end of the binding screw as at 22.

It will be understood from the foregoing and by reference to the drawings that the clamp by means of the binding screw may be secured to the dashboard or to a stanchion or side of a vehicle or to any upright portion of an agricultural machine and it will be further understood that since the angle arm is adjustable angularly with respect to the clamp and since the whip socket is adjustable angularly with respect to the angle arm, the whip socket may, when attached to a vehicle or machine, be readily adjusted to a vertical position and set at such adjustment.

What is claimed is:

The combination of a whip socket, an arm extending therefrom, a pivot sleeve attached to and projecting from said arm and having a head, a clamp pivotally mounted at one side on said sleeve and having means to engage said head and a set screw extending through and engaging said pivot sleeve and coacting with said clamp to secure the latter on a supporting object.

In testimony whereof I affix my signature in presence of two witnesses.

JACOB H. LARSON.

Witnesses:
L. A. HARLOW,
F. E. HARLOW.